2,993,016
DRY PLASTER MIX COMPRISING AGGREGATE, CLAY, CELLULOSE DERIVATIVE AND AMINE ALDEHYDE RESIN
Glenn Sucetti, P.O. Box 1960, Grass Valley, Calif.
No Drawing. Filed July 16, 1958, Ser. No. 748,796
6 Claims. (Cl. 260—15)

This invention relates to acoustical and heat insulating materials prepared from lightweight mineral aggregate and a binder.

This application is a continuation-in-part of my copending application Serial No. 678,039, now Patent 2,921,862, filed August 14, 1957, entitled "Acoustical Composition."

There are available today acoustical and thermally insulating materials of the general character described. That is to say, they are formed of a lightweight mineral aggregate and a binder. Such materials have definite advantages over conventional acoustical tiles. For example, the mineral aggregate-binder compositions with which the present invention is concerned are mixed with water and are sprayed onto a surface or they are applied with a trowel, thereby eliminating the laborious, time-consuming and expensive procedure required to apply acoustical tiles or panels. Also since the compositions with which the present invention is concerned are of a mineral character, they are fire-resistant and non-combustible, whereas most acoustical tiles presently used are flammable.

However, notwithstanding their advantages, mineral aggregate-binder materials intended for acoustical and/or heat insulating purposes have certain drawbacks and disadvantages. One widely used type of material employs expanded or exfoliated vermiculite as the mineral aggregate, and when a wet mix of the material is pumped through a long hose the granules of expanded or exfoliated vermiculite tend to be crushed. Crushing of these granules detracts from the sound-absorbing and heat insulating properties of the product.

Also mixes of the character described, after they have been applied and have set and hardened, may give unsatisfactory acoustical results because of the fact that the pores or voids are sealed by the binder and are not interconnecting.

A further difficulty that has been experienced is slowness of drying and setting. Thus it may be necessary to apply the base layer and then wait a week or more until it has hardened sufficiently to receive a finish coat. Also undesirable shrinkage has been experienced.

It is an object of the present invention to improve upon mineral aggregate-binder type compositions intended for acoustical and/or heat insulating purposes.

It is a further object of the invention to provide materials of the character described which, while in the form of a wet mix, can be pumped through a long hose without crushing the granules of lightweight porous aggregate or otherwise impairing the properties of the product.

A further object of the invention is to provide materials of the character described which, after application and setting and hardening, contain a large number of pores and voids which are open to the surface and are intercommunicating and which, therefore, serve as superior sound dampeners and absorbers.

Yet another object of the invention is to provide materials of the character described which set and harden rapidly so that a finish coat can be applied within a short time after application of the base layer.

The above and other objects of the invention will be apparent from the ensuing description and the appended claims.

In the above-mentioned copending application, a superior acoustical and/or heat insulating composition is formed by providing a lightweight porous aggregate such as expanded vermiculite or expanded perlite, preferably having a density not exceeding about 10 pounds per cubic foot; by also employing bentonite (or other suitable clay which swells when mixed with water), as the binder; and, by employing an air entraining agent, preferably saponified Vinsol Resin. Also there is advantageously included in the composition a hydraulic cement, preferably gypsum cement plaster. Among the advantages of mixtures of this character is the fact that air bubbles are entrained in the wet mixture as it is formed, which are stable during application; e.g., they do not break during transit through a hose under pressure. These bubbles, however, break when the wet mixture has been applied and hardens. This breaking of the bubbles creates open air cells within the hardened structure, which are interconnected and which communicate with the atmosphere, therefore provide a good acoustical medium. Also the bubbles serve to protect the lightweight porous mineral particles from crushing while the wet mixture is pumped through a hose.

The compositions of the present invention are similar to those of my copending application Serial No. 678,039 in that they consist predominantly of a lightweight porous mineral aggregate; they contain a colloidal mineral binder; they may contain, and in some cases preferably contain an hydraulic cement such as calcined gypsum; and they contain a bubble forming and/or air entraining agent. However, in accordance with the present invention, the useful properties of the products of my prior invention are greatly enhanced by including a certain type of organic binder and film forming agent which is described hereinafter.

The mineral aggregate component of the present compositions may be expanded or exfoliated vermiculite, expanded perlite or the like having an apparent density not greater than about 15 pounds per cubic foot, preferably not more than about 8 pounds per cubic foot. The preferred aggregates are expanded vermiculite and/or expanded perlite; that is to say, either one of these alone or the two in admixture. Of these two preferred aggregates, the more advantageous is expanded vermiculite.

The colloidal mineral binder component of the present compositions is preferably bentonite but it may be any other colloidal clay material which swells when mixed with water, which shrinks on drying, which will serve as a binder for mineral particles and which will serve also to impart a plastic quality to a wet mix adapting it to spray application. The optional hydraulic cement component of the present compositions is preferably a form of calcined gypsum such as gypsum plaster cement. Other suitable hydraulic cements are casting plaster and Trinity white cement which is a white Portland cement.

The preferred bubble forming and/or air entraining agent is Vinsol Resin but other agents having the same action may be used in its place. Vinsol Resin is the trademark of a product of Hercules Powder Company of Wilmington, Delaware, and it has been known since prior to 1940 as an extract of pinewood resin. In the form used in my present invention it is preferably neutralized with caustic alkali, preferably caustic soda and it is produced as follows:

Pinewood is extracted with hydrocarbon solvent such as benzene to form a preliminary extract consisting, after evaporation of the solvent, of a mixture of turpentine, pine oil, rosin, and the resin appropriate for use in practicing the present invention. The turpentine and the pine oil are removed from the mixture by distillation following which the remaining mixture is extracted with a preferential solvent, for example, a petroleum hydrocarbon such as petroleum ether or gasoline, which removes the rosin, leaving a dark colored resinous substance which, when freed from the excess solvent, forms the resin contemplated by the present invention. The method of producing this resin is fully described in the specification of U.S. Letters Patent No. 2,193,026, granted March 12, 1940. This resin is further characterized by a methoxy content of from 3% to 6%, a melting point by the drop method within the limits of about 115° C. to 125° C. and an acid number of about 100. The resin can be saponified by treatment with a solution of potassium hydroxide, for example, to produce a saponified resin solution in the manner more particularly described in the specification of U.S. Letters Patent No. 2,199,306, granted April 30, 1940.

The defined resin is known in the trade as "Vinsol" resin, which is a trademark of Hercules Powder Company, Wilmington, Delaware.

The organic binder and film forming agent used in accordance with the present invention is an organic material which is water-miscible and is, therefore, compatible with an aqueous mixture. It is, however, a material which will function as a binder for aggregate particles and whose aqueous solution, on drying, forms a film. This film forming property produces bubbles or cells in which the envelope is formed by the film. Such bubble formation differs from the bubble formation brought about by the Vinsol Resin. The latter produces bubbles and entrains air in the wet mixture as it is formed, thereby bulking the mix. The organic binder and film forming agent produces bubbles after the wet mixture has been applied, and the bubbles break and form a compound of interconnecting cells.

The preferred binder and film forming agent is sodium carboxymethylcellulose but other similar materials may be used, for example, water-soluble methyl cellulose. In general, water soluble, film forming cellulose derivatives may be used. Preferably a reactant material is also included which reacts with the sodium carboxymethylcellulose to insolubilize it and thereby form a water-insoluble film. Thus a water-soluble, urea-formaldehyde resin or a water-soluble melamine-formaldehyde resin or aluminum acetate may be incorporated. The resins react with the carboxymethylcellulose, apparently by cross polymerization. The aluminum acetate acts by replacement of the sodium ion of sodium carboxymethylcellulose. In either case the effect is one of insolubilization and the formation of a water-insoluble film. There is preferably also included along with the film forming agent and the reactant material, a substantial quantity of asbestos fibers which functions to give strength to the end product.

In summary, the plaster mix consists essentially of about 100 parts by weight of lightweight, porous mineral aggregate having an apparent density not greater than about 15 pounds/cubic foot, from about 5 to about 25 parts by weight of a water swelling clay such as bentonite, from about 0.5 to about 3 parts by weight of a water soluble cellulose derivative selected from the group consisting of sodium carboxy methyl cellulose and methyl cellulose, and from about 0.07 to about 0.70 parts by weight of a water soluble condensation product of an aldehyde with a material selected from the group consisting of urea and melamine, which when said dry mixture is mixed with water will react with said water soluble cellulose derivative to form at ambient temperature a water insoluble film.

The following specific examples will further illustrate the practice and advantages of my invention:

EXAMPLE 1.—ACOUSTICAL MIXTURE

An acoustical mixture can be prepared by mixing together 63 cubic feet (about 410 lbs.) of No. 2 expanded vermiculite, 200 pounds of gypsum cement plaster, 50 pounds of Formula A described hereinbelow, 50 pounds of bentonite, 5 pounds of Vinsol Resin (sodium salt), and 2 pounds of a commercial preparation known as Orvus (trademark of Procter & Gamble Co. of Cincinnati, Ohio) which contains about 40% of a sodium alkyl aryl sulfonate. A dry mixture of this character can be bagged, placed in other types of containers or left in bulk; it can be stored and shipped; and it can be mixed with water at the time and place of use. Preferably all of the dry ingredients except the vermiculite are mixed together and then the vermiculite is added and mixed in. About 36 pounds of the complete dry mixture may be mixed with about 10 gallons of water to produce a stiff paste which is mixed for 3 to 5 minutes, then an additional gallon of water is added and mixed 10–15 minutes. It will be noted that, on mixing with water, air is entrapped and the volume increases, e.g., by 20%.

This paste can be pumped through a long hose under pressure without damage to the expanded vermiculite and without appreciable loss of volume due to breakdown of the bubbles of entrained air. It can be sprayed onto a wall or other surface or applied by hand and then darbied and trowelled. When applied it will set and harden very rapidly. For example, it will set and harden enough in three hours under conditions of relatively low humidity and average room temperature, to permit application of a finish coat. After standing overnight it is hard enough to allow normal use of the area.

The ingredients of Example 1 (besides water added to form the wet mix) are No. 2 expanded vermiculite, gypsum cement plaster, bentonite, Formula A, Vinsol Resin and sodium alkyl aryl sulfonate.

The No. 2 vermiculite (which may be replaced by or mixed with other lightweight aggregate as explained above), is a known grade of expanded vermiculite having a size distribution as follows:

| Size: | Percent |
|---|---|
| −8 +10 | 2 |
| −10 +20 | 8 |
| −20 +30 | 68 |
| −30 +40 | 15 |
| −40 +70 | 4 |
| −70 +100 | 1 |
| −100 | 2 |
| | 100 |

The gypsum cement plaster (which may be replaced by other hydraulic cements as explained above) is preferably of low consistency type (i.e., requiring less water for a given strength) and it preferably also contains glass fibers. The glass fibers add to acoustical value and toughness, apparently by intersecting cracks and voids in the set and hardened product. The gypsum cement plaster imparts semi-hardness to the finished product and accelerates the rate of setting and hardening. The bentonite (which may be replaced by other clay materials as explained) functions as a binder. Also, on drying, the bentonite shrinks and its shrinkage causes bubbles within the structure to burst, thereby forming intercommunicating cells which improve the sound absorptive properties of the material. Also the bentonite encases the air cells and creates a softer, more sound-absorptive cellular structure.

The Vinsol Resin functions as an air entraining and bulking agent, and it may be replaced by other agents having the same effect and it also functions to wet the bentonite and thereby speed up the production of a plastic mix.

The sodium alkyl aryl sulfonate (which may be replaced by other surface active agents) imparts a desirable slip to the product which permits easier levelling with a darby. It also wets the bentonite with the advantage of more rapid mixing as noted above. The combined wetting effects of the Vinsol Resin and alkyl aryl sulfonate on bentonite may reduce the mixing time from two hours to five minutes. Also it functions to weaken the films which form the large bubbles, thereby producing small bubbles. As a result, the end product has an assortment of large, small and intermediate voids, which provide a broader range of sound absorption. Examples of suitable surface active agents are alkali metal alkyl sulfates such as sodium lauryl sulfate and alkali metal alkyl aryl sulfonates such as sodium ortho-n-lauryl benzene sulfonate. Such pure agents may be used, but less pure, commercial products or mixtures are equally effective and are much less expensive. Duponol, Orvus, Oronite, Nacconol and Santomerse are examples of commercial mixtures. Duponol is a trademark of E. I. du Pont de Nemours & Co., of Wilmington, Delaware, for a series of surface active agents in which the active ingredient is sodium lauryl sulfate. I may use Duponol WA Dry which consists of beads containing about 44–50% Na lauryl sulfate, or Duponol WAQ which is a viscous liquid containing about 30% Na lauryl sulfate. Orvus is a trademark of Procter & Gamble Co., of Cincinnati, Ohio, for a series of surface active agents. Orvus AB contains 40% of an alkyl aryl sulfonate as the active ingredient. Orvus WA contains sodium lauryl sulfate as the active ingredient. Nacconol is a trademark of the National Aniline Division, Allied Chemical & Dye Corp., New York, N.Y., for alkyl aryl sulfonates which are described in Schwartz and Perry, "Surface Active Agents," 1949, page 122. Oronite is a trademark of Oronite Chemical Co., San Francisco, California, for alkyl aryl sulfonates made by the method of Lewis U.S. Patent No. 2,477,383, e.g., by the method described in column 25, lines 6 to 31 of that patent.

Formula A of Example 1 (and of Examples 2 and 3 hereinafter), on the basis of 11 pounds total, is as follows:

| | |
|---|---|
| Asbestos | lbs__ 10 |
| Sodium carboxymethyl cellulose | oz__ 12 |
| Urea formaldehyde resin | oz__ 4 |
| Total | lbs__ 11 |

Converted to a 50 pound basis (the amount given in Example 1) Formula A is approximately as follows:

| | |
|---|---|
| Asbestos | lbs__ 45.5 |
| Sodium carboxymethyl cellulose | lbs__ 3.4 |
| Urea formaldehyde resin | lbs__ 1.14 |
| Total (approx.) | lbs__ 50 |

The sodium carboxymethyl cellulose of Formula A preferably has a substitution of about 0.65 to 0.85 sodium carboxymethyl groups ($-CH_2 \cdot COONa$) per anhydroglucose unit. It functions as a film-forming agent and binder. A suitable commercial product is CMC–70 High of Hercules Powder Co. One of the properties of Formula A which will be noted in the practice of my invention is that it swells when mixed with water, this being a property imparted by the sodium carboxymethyl cellulose. This swelling takes a matter of minutes to proceed to completion, and by selecting a finer grind of sodium carboxymethyl cellulose the time required can be diminished very substantially.

The urea-formaldehyde resin may be a product such as Cascamite No. 12, which is a trademark of The Borden Company, Chemical Division, New York, N.Y. described in bulletin TD–35 of November, 1951, of that company as a dry powder urea resin glue with catalyst incorporated which can be cured at temperatures of 70° F. to 260° F. It functions to insolubilize the film of sodium carboxymethyl cellulose. Other resins capable of insolubilizing such films, e.g., room temperature curing melamine-formaldehyde resins may be employed. Also, a water-soluble polyvalent metal salt such as aluminum acetate, chromium nitrate or ferric chloride may be used. The former class of materials (i.e., resins such as urea-formaldehyde) harden and insolubilize the carboxymethyl cellulose films by polymerization, probably by copolymerizing with the carboxymethyl cellulose. The latter class of materials (polyvalent metal salts) replace the sodium of the sodium carboxymethyl cellulose, with a polyvalent metal thereby forming water-insoluble salts of carboxymethyl cellulose.

The asbestos of Formula A may be any form of asbestos fibers but preferably it is a short-fibered asbestos having the following approximate screen analysis:

| Screen size: | Percent |
|---|---|
| +20 | 10 |
| −20 +40 | 12 |
| −40 +80 | 20 |
| −80 +100 | 20 |
| −100 +200 | 25 |
| −200 | 13 |

The preferred asbestos comes from the Phoenix Mine in Napa County, California, and is further characterized as follows: The asbestos as mined is crushed to −¾", dried and screened to reject +½" material. The drying is such that it does not drive off water of crystallization. The −½" portion is subjected to hammermilling and the milled material is subjected to air separation. The light fraction is used in Formula A.

The product of Example 1, as stated, is mixed with water and is applied by spraying or by means of a trowel. It applies easily, it sets and hardens rapidly and it bonds well to a variety of surfaces such as painted ceilings, metal, structural concrete, plaster, stucco, sheetrock, etc. The carboxymethyl cellulose forms a film which entraps air bubbles. These bubbles are formed after the mix has been applied and they break as the material dries by the disappearance of free water. On breaking, the bubbles form interconnecting cells or cavities which impart excellent acoustical properties to the end product.

EXAMPLE 2.—ACOUSTICAL FINISH MIXTURE

The mixture of Example 1 is suited to form the body of an acoustical layer, e.g., to form an acoustical plaster layer on a wall or ceiling. The present example illustrates a mixture which may be applied as a finish coat to a plaster base prepared with the mixture of Example 1. It may also be applied as an acoustical finish coat to other types of plaster.

A suitable formula is as follows:

63 cu. ft. (about 410#) No. 2 expanded vermiculite
9 cu. ft. (about 70#) No. 3 expanded perlite
60 lbs. Formula A of Example 1
50 lbs. bentonite
1 lb. sodium lauryl sulfate
100 lbs. short fibered asbestos, 7M or finer
50 lbs. pigment.

The above formula may be bagged in 25 lb. bags and mixed with 9 gallons of water at the time of use. Preferably 90% of the total quantity of water is added to a mixer, then the above mixture is added and mixed to form a bulky paste (about 25% increase in volume), and then the remainder of the water is added. Most of the ingredients are the same as in Example 1 although present in somewhat different proportions. It will be noted that gypsum cement plaster and Vinsol Resin are omitted. The former (gypsum cement plaster) is not needed because hardness and high speed of setting are not important for a thin finish coat. It is preferred to have a more open finish coat which will let sound penetrate easily to the interior. Sodium lauryl sulfate is used in place of Vinsol Resin to cause bulking. Perlite is included because it imparts a better spraying quality. The short fibered asbestos is advantageous because it gives strength to the finished coating. The presence or absence of pigment and its color will, of course, depend upon the desired color.

Substitutions may be made for the ingredients of Example 2, as in the case of Example 1, but the formulation given is preferred.

The wet mixture may be sprayed onto a base of acoustical plaster prepared from the mixture of Example 1 as soon as the latter has set and hardened sufficiently. Usually the finish coat can be applied a few hours after the base layer has been applied. A superior acoustical plaster is produced. It may be waterproofed with an asphalt emulsion if the color imparted by the emulsion is not objectionable. The finish coat bonds well not only to a base material such as that of Example 1, but also to structural concrete, sheetrock, painted surfaces, metal, etc. A batch prepared from 25# of dry mixture and 9 gallons of water will cover 18 to 24 square yards. The dry material may be stored indefinitely.

The finish coat of this example has some very unique and valuable properties. When applied to an acoustical base it has the property of opening up the base even when the finish coat is applied as a very thin coat. Also, if the finish coat is painted with a non-bridging acoustical paint, its acoustical value is not impaired; i.e., a paint which opens up on drying.

EXAMPLE 3.—HEAT INSULATING MATERIAL

A heat insulating material may be prepared in accordance with the following formula:

63 cu. ft. (about 410 lbs.) No. 2 expanded vermiculite
50 lbs. Formula A of Example 1
50 lbs. bentonite
100 lbs. gypsum cement plaster
2 lbs. Vinsol Resin Preferably all of the ingredients except the vermiculite are mixed together and are then mixed with the vermiculite. The dry mixture may be shipped in bags or other containers or in bulk and mixed with water in the proportion of 10 gallons of water per 25 pound bag, at the time of use. The wet mixture may be sprayed onto a surface. It hardens rather slowly and it bonds well to metal surfaces and undergoes no shrinkage. It provides a very excellent heat insulating coat which resists heat up to 2200° F.

The material is especially adapted for application to the undersides of metal used in the floors of buildings. Thus in the construction of structural steel buildings it is a common practice to employ sheet steel of corrugated or similar shape in the floors and to apply light weight concrete to the upper surface. The material of Example 3 is an excellent undercoat for such metal. It enables the flooring to undergo severe fire rating tests, it does not shrink and crack when heated and it has excellent bonding properties. When a layer of the material is heated to a high temperature, calcining of the gypsum has a cooling effect and the bentonite develops a ceramic bond to the metal at 1300° F.

In the formulation of Example 3, substitutions can be made as described above, but the formulation given is preferred. It will be observed that, as compared to Example 1, the heat insulating material of Example 3 contains less gypsum cement plaster, less Vinsol Resin and no surface active agent. The lesser quantity of gypsum cement plaster reflects the lesser need for hardness and quick setting. The absence of a surface active agent reflects the fact that a range of cells of different sizes (which give superior acoustical properties in the product of Example 1) is not necessary, and may be undesirable where heat insulation is the principal object.

The composition of Example 3 is optimum for purposes of heat insulation when applied as an insulating layer to metal. Thus, the Vinsol Resin causes rapid wetting of the bentonite. The stated proportion of gypsum cement plaster is optimum because substantially greater quantities may cause undue expansion at high temperatures with consequent damage to the bond of the insulation to the metal, but if substantially less gypsum cement plaster is used the insulation will shrink, crack and come loose from the metal at high temperatures. A one inch layer of insulation prepared in accordance with Example 3 will pass a severe 4 hour fire test.

The various mixtures (dry basis) of my present invention have a basic composition approximately as follows:

(1) Lightweight aggregate such as No. 2 expanded vermiculite __ 100 parts by weight.
(2) Bentonite _____ 5–25, preferably about 12½ parts by weight.
(3) Organic binder and film forming agent such as sodium carboxymethyl cellulose _____ ¼ to 3, preferably about one part by weight.

There is also preferably included (as part of Formula A, which includes the organic binder and film forming agent) an agent typified by urea-formaldehyde resin which insolubilizes the film of sodium carboxymethyl cellulose, such being used in quantity sufficient for the purpose. In the case of urea-formaldehyde resin, about 0.07 to 0.70 part by weight may be used, preferably about ⅓ part by weight. It is also preferred to incorporate a short fibered asbestos, which happens to be an ingredient of Formula A, such being used, for example, in an amount equal about 3 to 25, preferably about 10 to 15 parts by weight.

The basic composition above described will be "tailored", so to speak, or modified for the intended use. Typical modifications are as follows, in which parts are by weight and relate to 100 parts by weight of expanded vermiculite (or its equivalent).

*Modification No. 1*

To produce a superior acoustical plaster as in Example 1, a quick setting hydraulic cement such as gypsum cement plaster is added in the amount of about 25 to 100 parts, preferably about 50 parts. Also about ½ to 3 parts, preferably about 1¼ parts by weight of Vinsol Resin is added; also about ⅒ to ½ part, preferably about ¼ part of a surface active agent such as a sodium alkyl aryl sulfonate or sodium lauryl sulfate.

*Modification No. 2*

To produce a superior acoustical finish material, about 10 to 30, preferably about 18 parts of expanded perlite are added. Also, the proportion of Formula A is increased as noted in Example 2 and about 25 parts of short fibered asbestos are added, together with a pigment if desired. Also a surface active agent, preferably sodium lauryl sulfate is added in the amount of about ¼ part.

*Modification No. 3*

To produce a superior heat insulating material, about 10 to 50, preferably about 25 parts of gypsum cement plaster are added; also about ⅓ to 1, preferably about ½ part of Vinsol Resin.

As noted in Example 1, Vinsol Resin and the various surface active agents such as sodium alkyl sulfate or sodium alkaryl sulfonate act to wet the bentonite. This may be explained more fully as follows: When bentonite is mixed with water it wets slowly and normally requires about two hours to become plastic. The surface active agents of the present invention, also the Vinsol Resin of the present invention act as wetting agents for the bentonite and they cut down very greatly on the time required to form a plastic mix. Thus, one pound, or even less, of Vinsol Resin (sodium salt), Orvus or Duponol will accelerate the wetting of bentonite to such a degree that a plastic mass can be formed in five minutes.

It will, therefore, be apparent that acoustical and heat insulating compositions of greatly improved character are provided.

I claim:

1. A dry plaster mix which upon admixture with water forms a wet plastic trowelable or sprayable mass adherent to a surface to be plastered and which upon drying and setting forms a cellular heat and sound insulating layer, said mixture consisting essentially of about 100 parts by weight of lightweight, porous mineral aggregate having an apparent density not greater than about 15 pounds/cubic foot, from about 5 to about 25 parts by weight of bentonite, from about 0.5 to about 3 parts by weight of a water-soluble cellulose derivative selected from the group consisting of sodium carboxy methyl cellulose and methyl cellulose, and from about 0.07 to about 0.70 parts by weight of a water soluble condensation product of an aldehyde with a material selected from the group consisting of urea and melamine, which when said dry mixture is mixed with water will react with said water soluble cellulose derivative to form at ambient temperature a water insoluble film.

2. The dry plaster mix of claim 1 containing asbestos fibers in amounts of from about 3 to about 50 parts by weight.

3. The dry plaster mix of claim 1 containing gypsum cement plaster in amounts of from about 25 to about 100 parts by weight.

4. The dry plaster mixture of claim 1 wherein the mineral aggregate is selected from the group consisting of expanded vermiculite and expanded perlite.

5. The dry plaster mix of claim 1 containing a saponified petroleum insoluble, solvent extracted pine wood resin which is characterized by freedom from wood rosin, solubility in alcohol, a methoxy content of about 3.0 to about 6.0%, an acid number of about 100 and a melting point by the drop method of about 115° to about 125° C., in an amount of about 0.5 to about 3.0 parts by weight.

6. The dry plaster mixture of claim 2 wherein the mineral aggregate is expanded vermiculite.

References Cited in the file of this patent

UNITED STATES PATENTS

| | | |
|---|---|---|
| 1,830,253 | Bechtner | Nov. 3, 1931 |
| 1,937,011 | Eaton | Nov. 28, 1933 |
| 1,946,914 | New | Feb. 13, 1934 |
| 2,270,180 | Bass et al. | Jan. 13, 1942 |
| 2,382,561 | Gregory | Aug. 14, 1945 |
| 2,476,306 | King | July 19, 1949 |
| 2,542,364 | Schenker | Feb. 20, 1951 |
| 2,655,004 | Wertz | Oct. 13, 1953 |
| 2,702,753 | Dickey | Feb. 22, 1955 |
| 2,703,289 | Willson | Mar. 1, 1955 |
| 2,884,380 | Cook et al. | Apr. 28, 1959 |